United States Patent Office 3,639,321
Patented Feb. 1, 1972

3,639,321
POLYESTER MOULDING AND COATING MATERIALS WHICH CAN BE HARDENED BY UV-IRRADIATION
Karl Fuhr, Krefeld, Hans Rudolph, Krefeld-Bockum, and Hermann Schnell and Manfred Patheiger, Krefeld-Uerdingen, Germany, assignors to Farbenfabriken Bayer Aktiengesellschaft, Leverkusen, Germany
No Drawing. Filed Apr. 23, 1968, Ser. No. 723,621
Claims priority, application Germany, May 6, 1967, F 52,340; Mar. 9, 1968, F 55,020
Int. Cl. C08f 45/52
U.S. Cl. 260—28.5
8 Claims

ABSTRACT OF THE DISCLOSURE

Compositions which can be hardened by ultraviolet irradiation and have improved dark storability comprising an unsaturated polyester of an $\alpha,\beta$-unsaturated dicarboxylicacid and a polyol, a copolymerizable monomeric compound and, as photosensitizer, a benzoin ether of a secondary alcohol.

The present invention relates to moulding and coating materials which can be hardened by UV-irradiation and consist of mixtures, stabilised in the usual manner, of unsaturated polyesters and copolymerisable monomeric compounds with a content of photo-sensitizers.

When photo-sensitizers are applied to polymerisable substances, their effect is highly substrate-specific, as can be seen from many publications.

The hitherto known sensitizers for the photo-chemical polymerisation of polyester moulding and coating materials comprise compounds which belong to four different groups, viz: (1) C-alkyl-xanthogenic acid esters which are activated in the p-position to the sulphur atom by a double bond; (2) benzoin and those benzoins which are substituted in the $\alpha$-position by hydrocarbon radicals; (3) certain halogen compounds; and (4) aromatic disulphides. None of the compounds belonging to these groups has been accepted in practice, since their application is impaired by substantial deficiencies. Insofar as the compounds mentioned under (1) have a sufficient activity, they are difficult to obtain. The compounds mentioned under (2), admittedly, are easily prepared, but they reduce the "dark storability" of the polyester moulding masses to such an extent that they are unsuitable to serve as stable single-component systems such as are required for an economical processing on the assembly line. Moreover, they give rise to more or less strong discolourations of the hardened products. Because of such discolourations, also the compounds mentioned under (3) are unsatisfactory. Moreover, they are in most cases substantially less effective than the aforesaid products. Finally, the compounds mentioned under (4) permit of a rapid polymerisation under an energised irradiation of e.g. high pressure mercury vapour lamps, but there is the risk that a sensitive substrate, for example, wood, undergoes discolouration. Under the influence of less energised rays, e.g. the super-actinic irradiation of fluorescent lamps with a fluorescent coating which emits blue-violet light and rays in the long-wave ultra-violet range, their effectiveness is insufficient.

According to U.S. patent specification No. 2,448,828, on the other hand, acyloin ethers are effective sensitizers in the polymerisation of unsaturated monomeric compounds, such as acrylic and methacrylic acid derivatives, vinyl and vinylidene compounds and unsaturated hydrocarbons. As examples of acyloin ethers, there are mentioned benzoin methyl ether, benzoin ethyl ether, benzoin propyl ether, pivaloin ethyl ether and anisoin methyl ether.

Our own experiments have shown that polymerisation at room temperature can also be achieved within a short period of time, when these acyloin ethers are used as sensitizers in the photo-polymerisation of unsaturated polyesters or mixtures of unsaturated polyesters with unsaturated hydrocarbons, such as styrene. However, the polyester mixtures to which these acyloin ethers have been added, like the known other systems containing benzoin, have such poor stability in dark storage that they, too, cannot be used as single component systems.

The object of the present invention comprises moulding and coating materials which can be hardened by UV-irradiation and consist of mixtures, stabilised in the usual manner, of unsaturated polyesters and copolymerisable monomeric compounds with a content of benzoin compounds serving as photo-sensitizers, characterised in that they contain benzoin ethers of secondary alcohols as sensitizers.

Compared with the known materials containing the benzoin compounds mentioned above as sensitizers, the moulding and coating materials according to the invention, surprisingly, have a substantially improved stability in dark storage. When they are stored at room temperature with the exclusion of light, their stability is virtually unlimited and they are therefore eminently suitable, for example, as stable single component systems.

In the following Table 1 the values of stability in dark storage for benzoin are compared with those for benzoin ethers of primary and secondary alcohols. These sensitizers were dissolved in amounts of 2 percent by weight of the delivery form—stabilised in the usual manner with hydroquinone—of a typical unsaturated polyester obtained from maleic acid, phthalic acid and propylene glycol in admixture with styrene.

TABLE 1

Stability in dark storage of the delivery form of a typical polyester resin with a content of 2 percent by weight of sensitizer.

Sensitizer:                           Storage stability at 60° C.
   Benzoin—less than 1 day
   Benzoin-ethyl ether—less than 1 day
   Benzoin-isobutyl ether—less than 1 day
   Benzoin-isopropyl ether—7 days
   Benzoin-sec.-butyl ether—6–7 days
   Benzoin-cyclohexyl ether—5–6 days The materials according to the invention are further characterised in that they have an extremely high reactivity which permits of rapid hardening in the case of thin layers. In particular, they harden fast to form almost colourless mouldings or coatings, even under ultra-violet and visible irradiation of low-energy fluorescent lamps with an emission of 3000–5800 A.

The unsaturated polyesters comprise the usual polycondensation products of $\alpha,\beta$-unsaturated dicarboxylic acids with polyols.

Copolymerisable monomeric compounds are the unsaturated compounds customarily used in polyester technique, mainly styrene.

The moulding and coating materials are stabilised by adding known amounts of conventional inhibitors, such as p-benzoquinone, 2,5-di-tert.-butyl-benzoquinone, hydroquinone, tert.-butyl-pyrocatechol, 3-methyl-pyrocatechol and 4-ethyl-pyrocatechol, or copper compounds, e.g. copper naphthenate.

Examples of sensitizers to be used according to the invention are the benzoin ethers of the following alcohols: propanol-2, butanol-2, pentanol-2, pentanol-3, 3-methyl-pentanol-2, 2,4-dimethyl-pentanol-3, and cyclohexanol.

The moulding and coating materials according to the invention expediently contain the said benzoin ethers in amounts of about 0.1 to about 4, preferably from about 0.5 to about 2.5 percent by weight.

The benzoin ethers can be used by themselves or mixed with one another, optionally also in admixture with polymerisation catalysts, e.g. peroxides, in amounts of about 0.1 to about 4 percent by weight. Suitable peroxides are e.g. tert.-butyl perbenzoate, dicoumyl peroxide, benzoyl peroxide, lauroyl peroxide and primarily methyl ethyl ketone peroxide and cyclohexanone peroxide.

The addition of peroxides, primarily methyl ethyl ketone peroxide, is mainly recommended in cases where it is desired to exclude slight discolourations of the hardened products, as may occur during irradiation, but sometimes also during storage under the influence of light. Moreover, the adhesion of hardened coatings to the substrate is increased by the addition of peroxides.

The tendency to discolourations can also be reduced by the addition of acidic esters of phosphoric acids, for example, in amounts of about 0.01 to about 0.1 percent by weight.

In some cases it may be expedient to add a peroxide catalyst as well as an acidic ester of phosphoric acids.

An especially good protection against discolouration of the hardened product is achieved by the addition of UV absorbers in conventional quantities, e.g. derivatives of α-cyano-acrylonitrile, α-cyano-acrylic acid esters, hydroxybenzophenone, salicylic acid esters and o-hydroxyphenylbenztriazole. It has surprisingly been found that the photopolymerisation can thereby be carried out, even in thicker layers, without an appreciable delay, although the absorption of the UV absorbers lies between the range of a long-wave UV irradiation required for photopolymerisation.

Of especially slight influence on the activity of the photo-hardenable masses according to the invention and therefore excellently suitable are derivatives of o-hydroxybenzophenone, e.g. 2-hydroxy-4-methoxy-benzophenone, as well as derivatives of α-cyano-acrylic acid, e.g. α-cyano-β-(4-methoxyphenyl)-methacrylic acid methyl ester or the corresponding butyl ester whose absorption maxima are between 315 and 320 m$\mu$. The reactivity losses are increased, but still tolerable, if UV-absorbers are used which have absorption maxima of longer wave-length within the range of 330–340 m$\mu$, e.g. derivatives of o-hydroxyphenyl-benztriazole such as 2-(2'-hydroxy-5'-methylphenyl)-benztriazole, and α-cyano-β-N-(2-methyl-2,3-dihydroindolyl)-acrylic acid, such as the methyl ester.

The use of UV absorbers with absorption maxima in the range of 315–320 m$\mu$ does by no means cause reactivity losses which would jeopardize the technique utilization of the photo-polymerisable masses according to the invention as long as the UV absorbers are present in conventional concentrations, i.e. between about 0.005 and about 1%, preferably between about 0.01 and about 0.5%. When using UV absorbents with an absorption maxima within the range of 330–340 m$\mu$ in small concentrations, the reactivity loss is likewise low. The reactivity loss increases only in the presence of larger amounts, say from about 0.3%.

Films which are particularly fast-hardening and well adhering in the production of coatings, are also obtained when small amounts of a metal accelerator, for example, cobalt, zirconium and vanadium naphthenate or metal chelates, such as cobalt, zirconium and acetyl acetonate.

Metal accelerators of this type can also be added simultaneously with acidic esters of phosphoric acids or/and with peroxides. However, the storability of the materials is reduced if peroxides and metal accelerators are simultaneously present. It is therefore recommended to work in such a case according to the so-called active base method where the coating material is applied to a peroxide-containing layer which has previously been applied to the substrate.

It is particularly advantageous to use the benzoin ethers to be used according to the invention for coating materials to which there has been added wax or wax-like materials which float at the beginning of the polymerisation and prevent the inhibitory effect of atmospheric oxygen. An economical method of processing coating materials, which is devised for the assembly line, requires the fastest possible polymerisation to hard coatings. Admittedly, the polymerisation can be accelerated by heat supply, but since the formation of the paraffin or wax film which is required to exclude the air, is prevented by heat, an additional thermal acceleration, e.g. by infra-red irradiation, or by hot air, can only commence when the film has formed.

On the other hand, the period of time which elapses between the commencement of the hardening and the formation of the film is fairly long when only peroxide catalysts and accelerators are used, and a speedy processing is thus made difficult. The materials according to the invention are characterised in that they form a protective film within a short period of time, such as has hitherto not been achieved, when illuminated, even with the use of comparatively low-energy fluorescent lamps with super-actinic radiation. Thereafter, the final hardening may be accelerated by heat supply.

When mouldings are produced from the materials sensitized according to the invention, it is particularly advantageous that the materials can be completely hardened by an appropriately dosed irradiation without appreciable heat tone, even large mouldings being thus obtained crack-free. In the absence of peroxides and metal accelerators, the hardening may be interrupted, if desired, by darkening and can be completed after storage of the prepolymers thus obtained.

EXAMPLE 1

An unsaturated polyester prepared by condensation of 152 parts by weight maleic acid anhydride, 141 parts by weight phthalic acid anhydride and 195 parts by weight propane-1,2-diol is mixed with 0.045 part by weight hydroquinone and dissolved in styrene to give a 65 percent by weight solution. Portions of 100 parts by weight of the resultant resin delivery form are admixed with 20 parts by weight styrene, 1 part by weight of a 10 percent by weight solution of paraffin (M.P. 52–53° C.) in toluene and with various benzoin ethers of secondary alcohols. The solutions so obtained are applied to glass plates by means of a film extruder (250$\mu$) and illuminated with the radiation of a fluorescent tube (Osram L-lamp for tracing purposes, 40 watt, length 97 cm.) at a distance of 10 cm. The floating times of the paraffin are set out in Table 2.

TABLE 2

| Additive, referred to resin delivery form (percent by weight): | Floating time of paraffin after minutes |
|---|---|
| 2 benzoin-isopropyl ether | 1.9 |
| 2 benzoin-sec.-butyl ether | 2.1 |
| 2 benzoin-2-pentyl ether | 2.3 |
| 2 benzoin-3-pentyl ether | 2.3 |
| 2 benzoin-2,4-dimethyl-3-pentyl ether | 2.4 |

After a total illumination time of 10–15 minutes the films have a pencil hardness of more than 6 H. They are almost colourless.

EXAMPLE 2

100 parts by weight of the resin delivery form described in Example 1 are mixed with 20 parts by weight styrene, 1 part by weight of a 10 percent by weight solution of paraffin (M.P. 52–53° C.) in toluene, 1 part by weight benzoin-isopropyl ether and, in addition, with various peroxides, acidic phosphoric acid esters and metal-containing compounds (see Table 3). These solutions are applied in layers of 250$\mu$ thickness to glass plates by means of a film extruder and illuminated at a distance of 10 cm. with the radiation of the fluorescent lamp described above.

TABLE 3

| Additives, referred to resin delivery form (percent by weight) | Floating time of paraffin after (minutes)— | Pencil hardness >6H after (minutes)— |
|---|---|---|
| (1) 4 benzoyl peroxide paste (50% in plasticiser) | 2.2 | 20 |
| (2) 4 coumol hydroperoxide solutoion (70%) | 2.2 | 20 |
| (3) 4 methyl ethyl ketone peroxide (40% in plasticiser) | 2.3 | 22 |
| (4) 0.1 mixture of mono- and dibutyl-phosphoric acid ester | 2.4 | 18 |
| (5) 4 methyl ethyl ketone peroxide solution (40% in plasticiser); 0.1 mixture of mono- and dibutyl-phosphoric acid ester | 2.3 | 24 |
| (6) 1 cobalt napthenate solution (20% in toluene) | 2.2 | 16 |
| (7) 1 zirconium napthenate solution (6% zirconium in a toluene solution) | 2.4 | 18 |
| (8) 4 methyl ethyl ketone peroxide (40% in plasticiser); 1 cobalt napthenate solution 20% in toluene) | 2.2 | 19 |
| (9) 4 methyl ethyl ketone peroxide (40% in plasticiser); 1 cobalt napthenate solution (20% in toluene); 0.1 mixture of mono- and dibutyl phosphoric acid ester | 2.3 | 19 |

After a total illumination time of 10–20 minutes, the pencil hardness amounts of 6 or more. If, after the floating of the paraffin, the polymerisation is completed with the aid of infra-red irradiation or hot air, than a pencil hardnes of >6 is attained already after an illumination time of 10–13 minutes.

The floating time of the paraffin in the presence of 1 percent by weight benzoin-isopropyl ether but without further additives amounts to 2.2 minutes, the hardness of >6 is attained after an illumination time of 20 minutes.

The films produced according to (1), (2), (4) and (7) are almost colourless, those obtained according to (6), (8) and (9) are pale pink, and those prepared according to (3) and (5) are practically colourless.

EXAMPLE 3

100 parts by weight of the resin delivery form described in Example 1 are mixed with 20 parts by weight styrene, 1 part by weight of a 10 percent by weight solution of paraffin (M.P. 52–53° C.) in toluene, and 2 parts by weight of benzoin-isopropyl ether.

The resin mixture spread in layers of 0.6–0.8 cm. thickness gels when illuminated by the fluorescent lamp described above. After illumination for 6 hours at a distance of 8 cm., there is obtained a hard plate-shaped polymer which is almost colourless.

EXAMPLE 4

An unsaturated polyester obtained by condensation of 1765 parts by weight maleic acid anhydride, 756 parts by weight glycol, 405 parts by weight 1,3-butane-diol and 1540 parts by weight trimethylol-propane-diallyl ether in the presence of 0.83 part by weight hydroquinone is dissolved in styrene to give a 70 percent by weight solution.

100 parts by weight of the resultant delivery form and 1 part by weight of a cobalt naphthenate solution (20 percent by weight in toluene) are mixed with 2 parts by weight benzoin-isopropyl ether.

The solution is photo-polymerised in the form of a layer of 250μ thickness at a distance of 10 cm. by the fluorescent lamp described above. The film has gelled after illumination for 3 minutes. After an illumination time of 30 minutes, the film has a pencil hardnes of >6 H.

The same result is obtained when the benzoin-isopropyl ether is replaced with the same amount of benzoin-sec.-butyl ether.

EXAMPLE 5

An unsaturated polyester prepared by condensation of 112 parts by weight phthalic acid anhydride, 293 parts by weight maleic acid anhydride, 100 parts by weight ethylene glycol and 202 parts by weight 1,3-butylene and glycol is mixed with 0.12 part by weight hydroquinone and dissolved in styrene to give a 65 percent by weight solution. 200 parts by weight of this polyester moulding material which has a temperature of 80° C. are admixed with 0.8 part by weight stearic acid cyclohexylamide in the melted state. After cooling to room temperature, there is obtained a gel-like substance. 2 parts by weight benzoin-isopropyl ether are stirred into 100 parts by weight of this substance.

The resin mixture is applied to glass in the form of a layer of 500μ thickness. Gelling sets in after 1½ minutes under the fluorescent lamp described above at a distance of 10 cm. After an illumination time of 12 minutes, the layer is completely polymerised to a film with a pencil hardness of >6 H.

It is also possible to coat articles of, for example, glass or wood with the resin mixture described above by immersion. If a glass rod is provided by immersion with a polyester layer of about 0.1 cm. thickness, the layer is completely polymerised to a hard coating after illumination for 30 minutes with continuous rotation of the rod.

EXAMPLE 6

An active base consisting of 50 g. of a nitrocellulose solution (20 percent by weight in ethyl acetate), 18 g. butyl acetate, 10 g. methyl ethyl ketone peroxide (40 percent by weight in plasticiser and of sufficient ethyl acetate to make up a volume of 100 ml. is applied to wood as a layer of 100μ thickness. When the solvent has evaporated, a polyester resin mixture consisting of 100 parts by weight of a resin delivery form as described in Example 1, 20 parts by weight styrene, 1 part by weight of a 10 percent by weight solution of paraffin in toluene, 1 part by weight benzoinisopropyl ether and various other additives, is applied as a layer of 250μ thickness and irradiation is carried out with the fluorescent lamp described above. Description of the additives and the results of the polymerisation are set out in Table 4.

TABLE 4

| Additives, referred to resin delivery form (percent by weight) | Floating time of paraffin after (minutes)— | Pencil hard ness >6H after (minutes)— |
|---|---|---|
| (1) Without additive | 1.9 | 18 |
| (2) 1 cobalt napthenate solution (20% in toluene) | 2.0 | 17 |
| (3) 0.1 mixture of mono- and dibutyl-phosphoric acid ester | 2.0 | 18 |
| (4) 1 cobalt napthenate solution (20% in toluene); 0.1 mixture of mono- and dibutyl phosphoric acid ester | 2.1 | 17 |

Colourless or pale pink coatings of very good adhesion are obtained. The polymerisation time can be shortened even further with the aid of infra-red irradiation or hot circulating air.

EXAMPLE 7

An unsaturated polyester prepared by condensation of 179 parts by weight maleic acid anhydride, 116 parts by weight phthalic acid anhydride and 208 parts by weight propanediol-1,2 is admixed with 0.045 part by weight hydroquinone and dissolved in styrene to give a 65 percent by weight solution. Portions of 100 parts by weight of the resultant resin delivery form are admixed with 20 parts by weight styrene, 1,5 parts by weight benzoin-isopropyl ether, 1 part by weight of a 10 percent by weight solution of paraffin (melting point (52–53° C.) in toluene as well as various UV absorbers in quantities of 0.1 and 0.5 part by weight respectively and, in one case, of 0.3 part by weight. The solution is applied to glass plates at a layer thickness of about 250μ. In the first test series the glass plates are illuminated with the radiation of a fluorescent tube at a distance of 5 cm. in a second test series with a radiation of black-light lamp at a distance of 10 cm. The floating times of paraffin and the times required for obtaining a pencil hardness of >6H are measured. The values obtained are given in the following table.

TABLE

Floating times of paraffin and illumination times required for obtaining a pencil hardness of >6H in the case of photo-polymerisable polyester resin solutions which are admixed with UV absorbents in dependence on the UV absorber concentration used and of two types of lamps.

| UV absorbers added | Fluorescent tube | | Black-light lamp | |
|---|---|---|---|---|
| | Floating time of the paraffin in min. | Illumination time at a hardness of >6H in min. | Floating time of the paraffin in min. | Illumination time at a hardness of >6H in min. |
| Without addition | 0.8 | 10 | 0.35 | 3.0 |
| UV absorber 1: | | | | |
| 0.1 parts by weight | 0.9 | 12 | 0.35 | 3.5 |
| 0.5 part by weight | 1.7 | 15 | 0.70 | 6.0 |
| UV absorber 2: | | | | |
| 0.1 part by weight | 1.1 | 12 | 0.40 | 3.5 |
| 0.5 part by weight | 1.4 | 14 | 0.80 | 5.5 |
| UV absorber 3: | | | | |
| 0.1 part by weight | 1.7 | 16 | 0.70 | 5.5 |
| 0.3 part by weight | 4.3 | 30 | 2.70 | 15 |
| 0.5 part by weight | 4.8 | >45 | 4.00 | >15 |

The following UV absorbers are used: UV absorber 1: $\alpha$-(4-methoxyphenyl)-$\beta$-cyano-methacrylic acid butyl ester; UV absorber 2: 2-hydroxy-4-methoxy-benzophenone; UV absorber 3: 2-(2'-hydroxy-5'-methylphenyl)-benztriazole.

EXAMPLE 8

After hardening the polymers are subjected to a direct radiation of a xenone high-pressure lamp for 15 hours at a distance of about 30 cm. During that time, the layer which does not contain UV absorbers, has undergone a slight yellow coloration. The films containing UV absorbers are protected against discoloration.

We claim:
1. A moulding and coating composition which can be hardened by ultra-violet irradiation and has improved dark storability comprising a mixture of unsaturated polyester of an $\alpha,\beta$-unsaturated dicarboxylic acid and a polyol, a copolymerizable monomeric compound and, as photosensitizer, a benzoin ether of a secondary alkanol containing up to seven carbon atoms or of cyclohexanol.
2. The moulding and coating composition of claim 1 containing an organic peroxide catalyst.
3. The moulding and coating composition of claim 2 wherein said organic peroxide catalyst is a ketone hydroperoxide.
4. The moulding and coating composition of claim 1 contains monobutyl or dibutyl phosphoric acid ester.
5. The moulding and coating composition of claim 1 containing an ultra-violet absorber.
6. The moulding and coating composition of claim 1 containing a floatable wax which inhibits the effect of atmospheric oxygen at the time of polymerization.
7. The moulding and coating composition of claim 3 containing an accelerator selected from the group consisting of cobalt naphthenate, zirconium naphthenate, vanadium naphthenate, cobalt acetyl acetonate and zirconium acetyl acetonate.
8. The moulding and coating composition of claim 1 wherein said secondary alkanol is selected from the group consisting of propanol-2, butanol-2, pentanol-2, pentanol-3, 3-methyl-pentanol-2 and 2,4-dimethyl-pentanol-3.

References Cited
UNITED STATES PATENTS 2,448,828  7/1948  Renfrew _____ 204—159.21
3,326,710  20/1967  Brodie _____ 204—159.19

MORRIS LIEBMAN, Primary Examiner

T. MORRIS, Assistant Examiner

U.S. Cl. X.R.

204—159.19, 159.21; 260—32.2, 32.8